(12) United States Patent
Franzoni et al.

(10) Patent No.: US 9,555,970 B2
(45) Date of Patent: Jan. 31, 2017

(54) POSITIVE DRIVE BALANCED MESH BELT SYSTEM

(71) Applicant: Cambridge International Inc., Cambridge, MD (US)

(72) Inventors: Michael Robert Franzoni, Cumberland, RI (US); George H. Messick, Jr., Cambridge, MD (US); Robert E. Maine, Jr., Salisbury, MD (US)

(73) Assignee: CAMBRIDGE INTERNATIONAL INC., Cambridge, MD (US)

( * ) Notice: Subject to any disclaimer, the term of this patent is extended or adjusted under 35 U.S.C. 154(b) by 0 days.

(21) Appl. No.: 14/218,343

(22) Filed: Mar. 18, 2014

(65) Prior Publication Data

US 2014/0262697 A1    Sep. 18, 2014

Related U.S. Application Data

(60) Provisional application No. 61/800,526, filed on Mar. 15, 2013.

(51) Int. Cl.
| | |
|---|---|
| *B65G 15/48* | (2006.01) |
| *B65G 17/08* | (2006.01) |
| *B65G 17/06* | (2006.01) |
| *B65G 15/42* | (2006.01) |
| *B65G 15/54* | (2006.01) |
| *B65G 23/06* | (2006.01) |

(52) U.S. Cl.
CPC ............. *B65G 15/48* (2013.01); *B65G 15/42* (2013.01); *B65G 15/54* (2013.01); *B65G 17/06* (2013.01); *B65G 17/064* (2013.01); *B65G 17/08* (2013.01); *B65G 23/06* (2013.01)

(58) Field of Classification Search
CPC ......... B65G 15/54; B65G 15/42; B65G 17/06; B65G 17/08; B65G 17/064; B65G 23/06
USPC ................................................... 198/835, 848
See application file for complete search history.

(56) References Cited

U.S. PATENT DOCUMENTS

| 2,025,620 | A | * | 12/1935 | Sneesby | 198/690.2 |
|---|---|---|---|---|---|
| 2,370,954 | A | | 6/1945 | Guba | |
| 2,628,706 | A | | 2/1953 | Guba | |
| 2,769,531 | A | * | 11/1956 | Guba | 198/848 |
| 3,055,488 | A | * | 9/1962 | Stone | 198/699.1 |
| 3,315,788 | A | * | 4/1967 | Anderson | 198/690.2 |
| 3,859,865 | A | | 1/1975 | Conrad | |
| 5,160,020 | A | * | 11/1992 | Thomas, Sr. | 198/834 |
| 5,423,416 | A | * | 6/1995 | Kucharski | 198/690.2 |

(Continued)

OTHER PUBLICATIONS

International Search Report and Written Opinion for corresponding Application No. PCT/US2014/031066.

*Primary Examiner* — Leslie A Nicholson, III

(74) *Attorney, Agent, or Firm* — Buchanan Ingersoll & Rooney PC

(57) ABSTRACT

A compound balanced woven-wire conveyor belt including a plurality of interwoven helically-wound spirals and connector rods, and a plurality of spiral wires forming protruding tangs on a surface of the woven-wire belt. A conveyor system further includes at least one rotatable member including an outer cylindrical surface symmetrically disposed relative to a central axis of rotation of the rotatable member and a plurality of cavities on the outer cylindrical surface for engaging the protruding tangs of the woven-wire belt, each of the protruding tangs substantially corresponding to the cavities of the rotatable member.

14 Claims, 6 Drawing Sheets

(56) References Cited

U.S. PATENT DOCUMENTS

| | | | |
|---|---|---|---|
| 5,449,063 A | | 9/1995 | Thomas, Sr. |
| 6,041,916 A | | 3/2000 | Daringer et al. |
| 6,129,205 A | * | 10/2000 | Ergenbright et al. ......... 198/852 |
| 7,021,457 B1 | * | 4/2006 | Schiltz .......................... 198/835 |
| 7,244,205 B2 | * | 7/2007 | Kanaris .................. B65G 23/06 |
| | | | 198/834 |
| 2007/0235290 A1 | | 10/2007 | Perrin et al. |
| 2008/0190462 A1 | * | 8/2008 | Guldenfels ............... B08B 3/02 |
| | | | 134/44 |

* cited by examiner

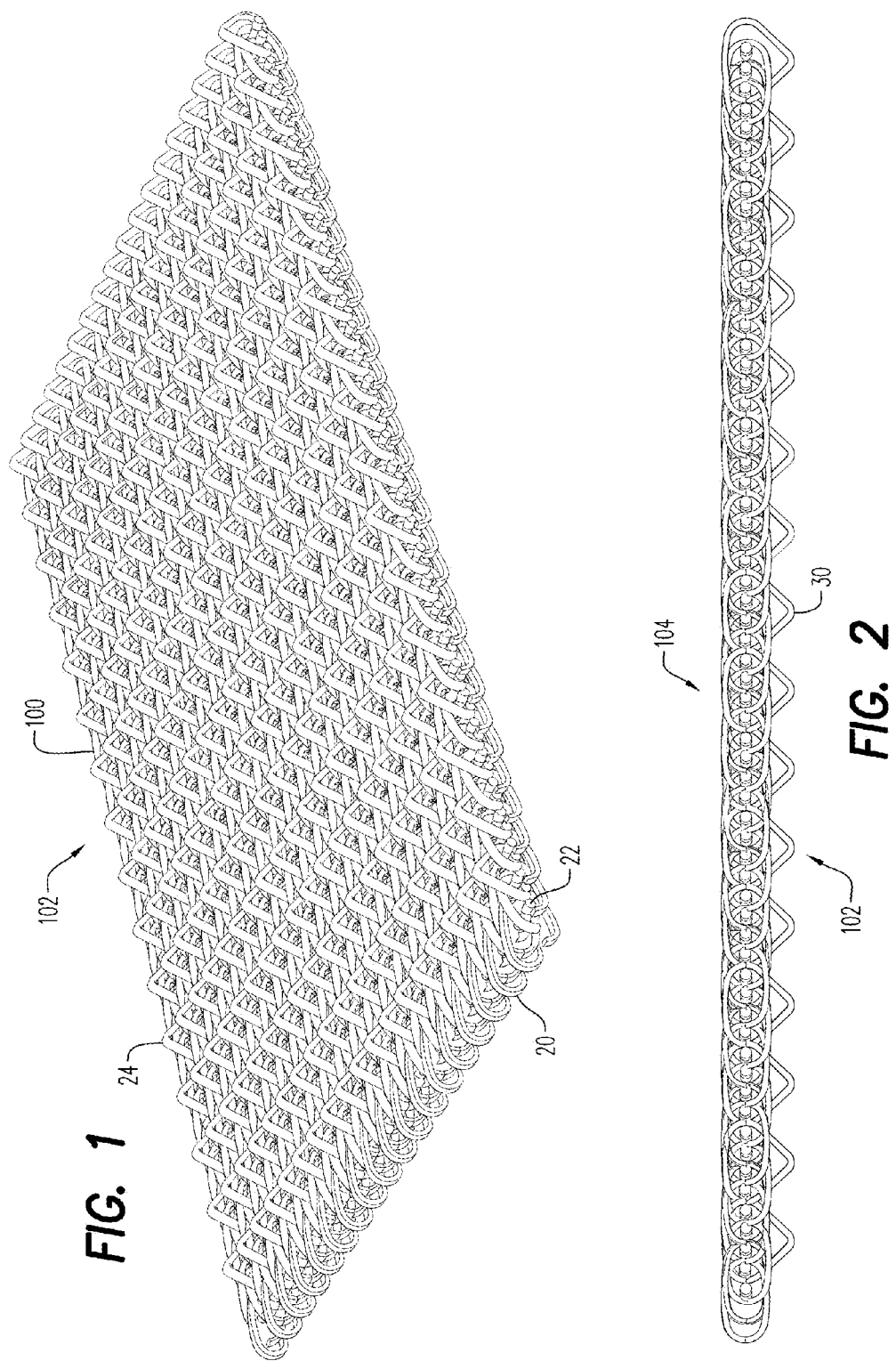

POSITIVE DRIVE BALANCED MESH BELT SYSTEM

TECHNICAL FIELD

The disclosure herein is directed to a conveyor belt system including a conveyor belt and a rotatable drive member for the conveyor belt, particularly, to a balanced mesh conveyor belt and a positive drive roll therefor, and more particularly to a compound-balanced or small opening balanced mesh conveyor belt and a positive drive roll therefor.

BACKGROUND

Woven wire mesh has been manufactured for many years and has a multitude of uses including, but not limited to conveying and filtration. Meshes vary in their composition and this dictates how dense or coarse the openings are within the mesh. The particular application of the woven wire mesh also dictates what size mesh is used, be it for product retention, air flow requirements, relative belt strength, etc. Certain applications require a low open area percentage belt and a dense mesh. Using a tight weave with smaller gage wire will generally result in a belt that has very small openings and a low percentage open area. However, in some cases, in order to achieve an even tighter open area requirement or more uniform belt surface, multiple strands of spirals are nested together along with multiple connecting rods creating a belt type referred to as compound-balanced belting. There can be two, three, four, or five spirals and connecting rods nested together in this type of belting. One of the inherent problems with tightly woven belts, such as compound-balanced belting, is its need for auxiliary tracking mechanisms such as rollers or edge guides. Another limiting aspect of such a tightly woven wire conveyor belt is that because of its mass, the belt requires a tremendous amount of friction to drive it. This comes from a tensioning system that is sometimes hydraulic in construction, as well as a relatively large drum (typically 24"-36" in diameter), thus requiring a large amount of space for such an installation.

Prior art shows that there are multiple inventions that positively drive woven wire belts by use of a sprocket "tooth" that engages inside the spiral opening itself as there is an opening to do so. A known woven wire mesh includes a plurality of helically-wound spiral wires disposed between two connector rods which are positioned to be sequentially adjacent in the lengthwise direction of belt assembly and intended travel. Such combination of a helically-wound spiral and associated connector rods defines a plurality of widthwise side-by-side open-access recesses. Such recesses extend across the width of the belt and are utilized in shaping roll protrusions for uniform belt drive and increased drive contact across the width of the belt. That is, parallelogram-shaped protrusions or teeth are machined on the surface of a drive roll or sprocket so as to interfit with the confronting surface openings of the conveyor belt. Thus, a drive roll or sprocket having specially-shaped protrusions provides for uniform drive across the belt width and increased widthwise dimensional drive contact. A woven wire conveyor system of this type is disclosed in U.S. Pat. No. 6,041,916, the entire contents of which are hereby incorporated by reference.

However, where the mesh is very dense, such as in a tightly woven balanced belt or compound balanced construction, the above method of driving the belt utilizing sprocket protrusions is not a viable option as there is no room for a tooth to fit into the spiral opening.

Another limiting factor in positive-drive belting systems that use teeth engaged in openings is the engagement problem that can occur due to the belt's thermal expansion in width. When thermal expansion occurs to the belt along its width, the driving sprocket or toothed roll does not expand with it or at the same rate. The engagement issue crops up when the teeth on the sprocket or roll do not match the openings of the belt along its width. As the mesh becomes denser and wider, the belt can expand more than the machined teeth can handle, thus creating a thermal expansion problem.

Hence, while compound-balanced belting may exhibit outstanding performance and has enjoyed substantial commercial success, the necessity for auxiliary tracking mechanisms and the large friction drive requirements impose a potential limitation on utilizing such belting to its fullest capability. Accordingly, there exists a need in the marketplace for a compound-balanced woven wire conveyor system that can overcome these inherent issues conventionally experienced with compound-balanced belting.

SUMMARY

These and other objects are met by a conveyor system comprising a compound balanced woven-wire belt assembled from a plurality of interwoven helically-wound spirals and connector rods, said woven-wire belt further including a plurality of shaped spiral wires forming protruding tangs on a surface of the woven-wire belt; and at least one rotatable member including an outer cylindrical surface symmetrically disposed relative to a central axis of rotation of said member and a plurality of spaced cavities on said outer cylindrical surface for engaging said protruding tangs of said woven-wire belt, each of said protruding tangs substantially corresponding to the cavities of said rotatable member.

A further aspect of the disclosure provides a compound balanced woven-wire conveyor belt comprising a plurality of interwoven helically-wound spirals and connector rods, and a plurality of shaped spiral wires forming protruding tangs on a surface of the woven-wire belt.

BRIEF DESCRIPTION OF THE DRAWING FIGURES

These and other features, and advantages of the disclosure herein will become more readily apparent to those skilled in the art upon reading the following detailed description, in conjunction with the appended drawings in which:

FIG. 1 is bottom perspective view of a compound-balanced woven wire conveyor belt in accordance with an exemplary embodiment disclosed herein.

FIG. 2 is a side view of the compound-balanced woven wire conveyor belt shown in FIG. 1.

DETAILED DESCRIPTION

Figure 3:
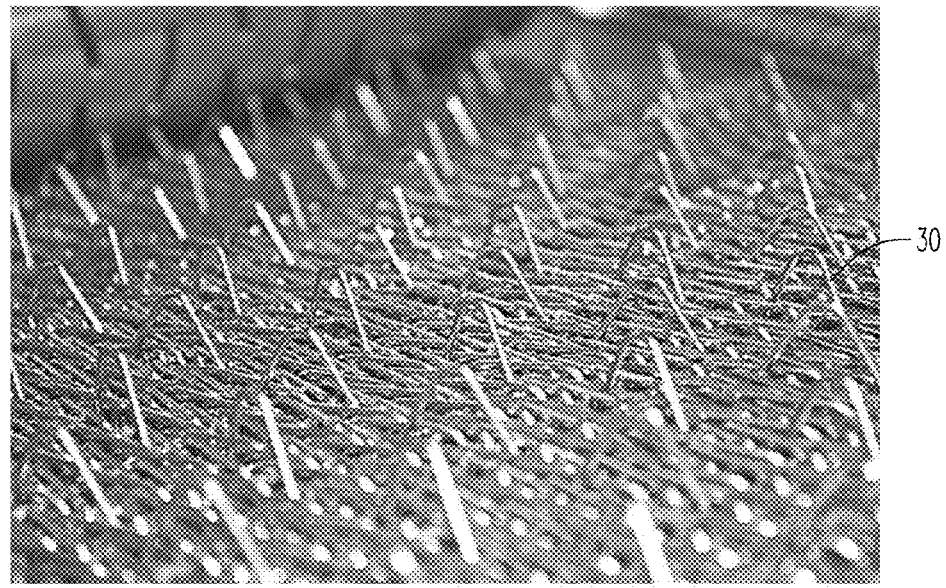
FIG. 3 is a further bottom perspective view thereof.
Figure 4:
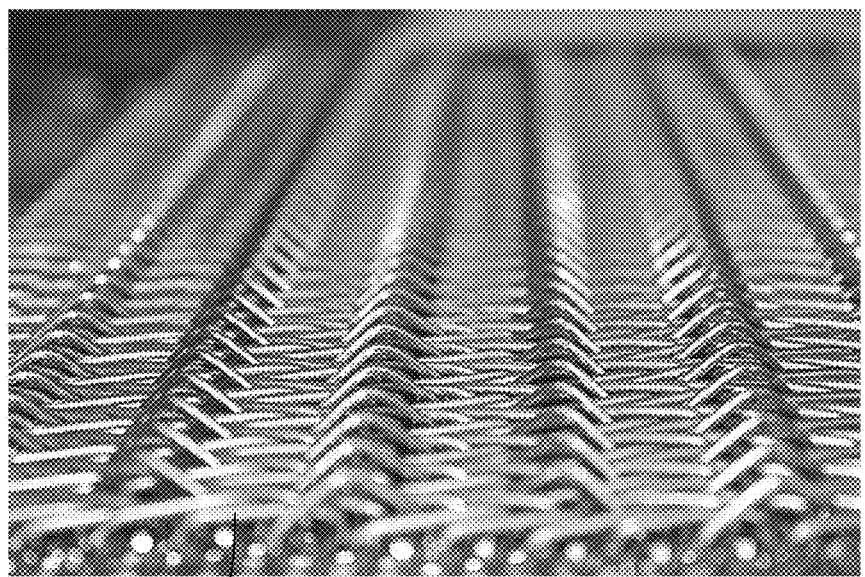
FIG. 4 is bottom perspective view thereof.

A tightly woven or small opening conveyor belt system, and more preferably, a compound-balanced woven wire mesh conveyor belt system 200 in accordance with a first exemplary embodiment disclosed herein includes a compound-balanced woven wire mesh conveyor belt shown generally in FIGS. 1-6 by reference numeral 100. In assembling compound-balanced woven-wire belt 100, a plurality of helically-wound spiral wires 20 are associated with connector rods 22 positioned to be sequentially adjacent in the lengthwise direction of belt assembly and intended travel. As illustrated in the exemplary embodiment, multiple strands of spirals 20 are nested together along with multiple connecting rods 22.

In order to obtain a mechanical advantage to positively drive the compound-balanced woven wire conveyor belt 100, belt 100 further includes a plurality of "special" or polygon shaped spirals 24 at varying pitches to create an engagement point for a drive pulley or roll 26 with mating cavities 28. The spirals 24 define projections or drive tangs 30 on a first or bottom surface 102 of belt 100. The drive tangs 30 may be triangular in shape with an apex of the triangle extending from the bottom surface 102, and devoid of any supporting structure within the triangle such that the drive tangs 30 are self-supporting, as shown in FIG. 3. An alternative shape such as a D-shaped or trapezoidal shaped spiral could also be used. The second or top surface 104 of belt 100 does not include the protruding drive tangs 30 since it will not engage with the drive roll 26. Thus, the belt's top surface 104 will remain a generally smooth surface as this is typically a requirement of applications using this type of belting.

Figure 5:
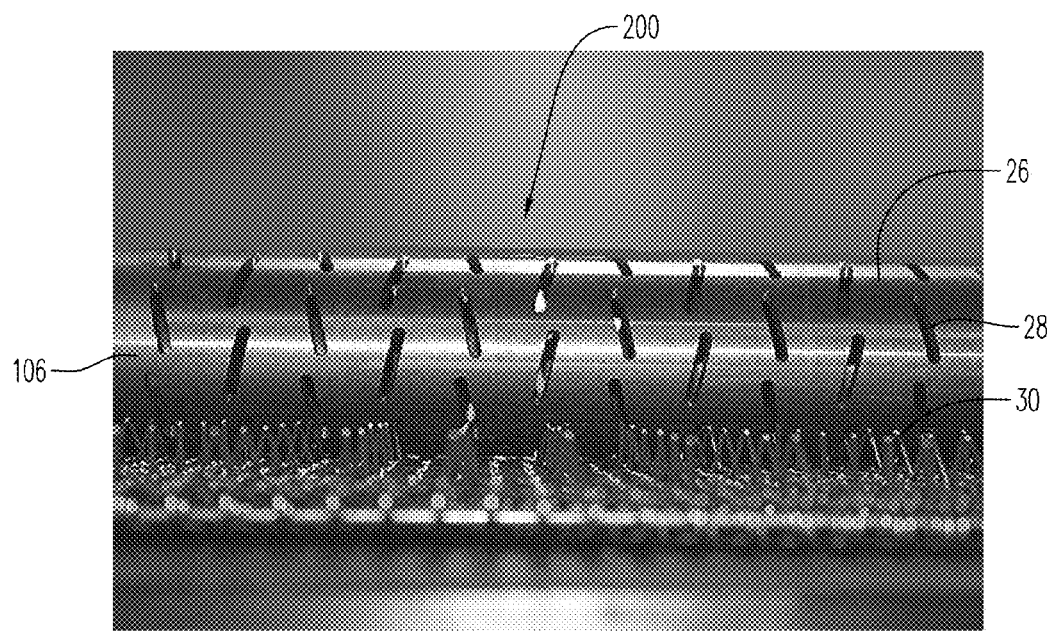
FIG. 5 is a perspective view of a compound-balanced woven wire conveyor belt and mating drive roll in accordance with an exemplary embodiment disclosed herein.
Figure 6:
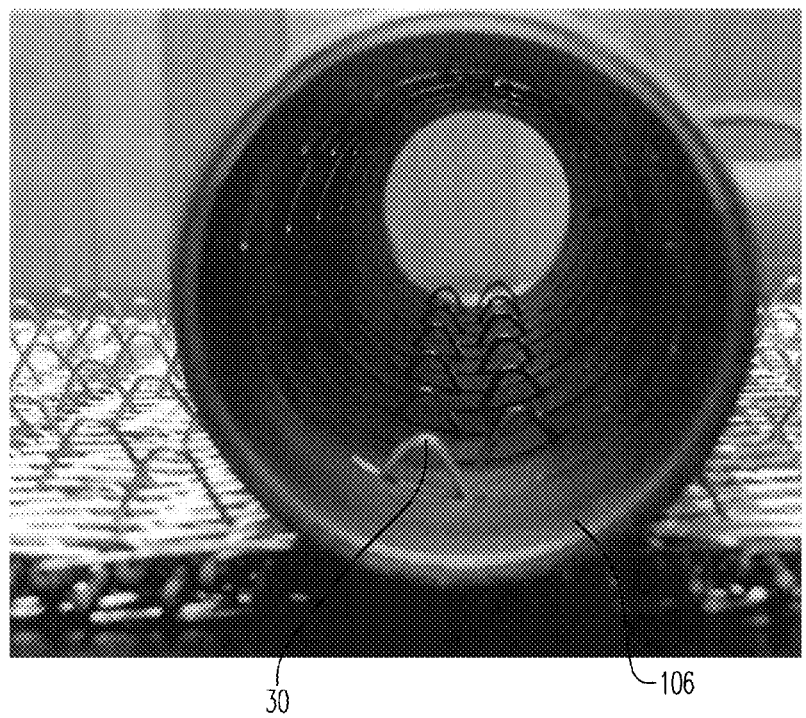
FIG. 6 is an enlarged end elevational view of the drive roll shown in FIG. 5 in mating engagement with the conveyor belt.

An exemplary drive roll or drive pulley for use with the compound-balanced woven wire conveyor belt 100 is shown generally in FIGS. 5 and 6 by reference numeral 26. Roll 26 preferably comprises a hollow, heavy-walled tubular member 106 and a stub shaft (not shown) disposed on each end thereof. The mating drive roll 26 will preferably be machined in such a way to engage the drive tangs 30 of the "special" spirals 24. More specifically, the tubular member 106 includes a plurality of slotted openings or cavities 28 for matingly engaging the drive tangs 30 of the polygon shaped spirals 24. Because the belt 100, 100' is positively driven and thus lowers the overall system tension, the drive requirements (lower torque) will also be reduced, which in turn will reduce the necessary footprint of the gear and motor combination. Still further, cavities 28 in the drive roll 26 can be sized to accommodate a differential in thermal expansion between the belt 100, 100' and the drive roll 26.

Figure 7:
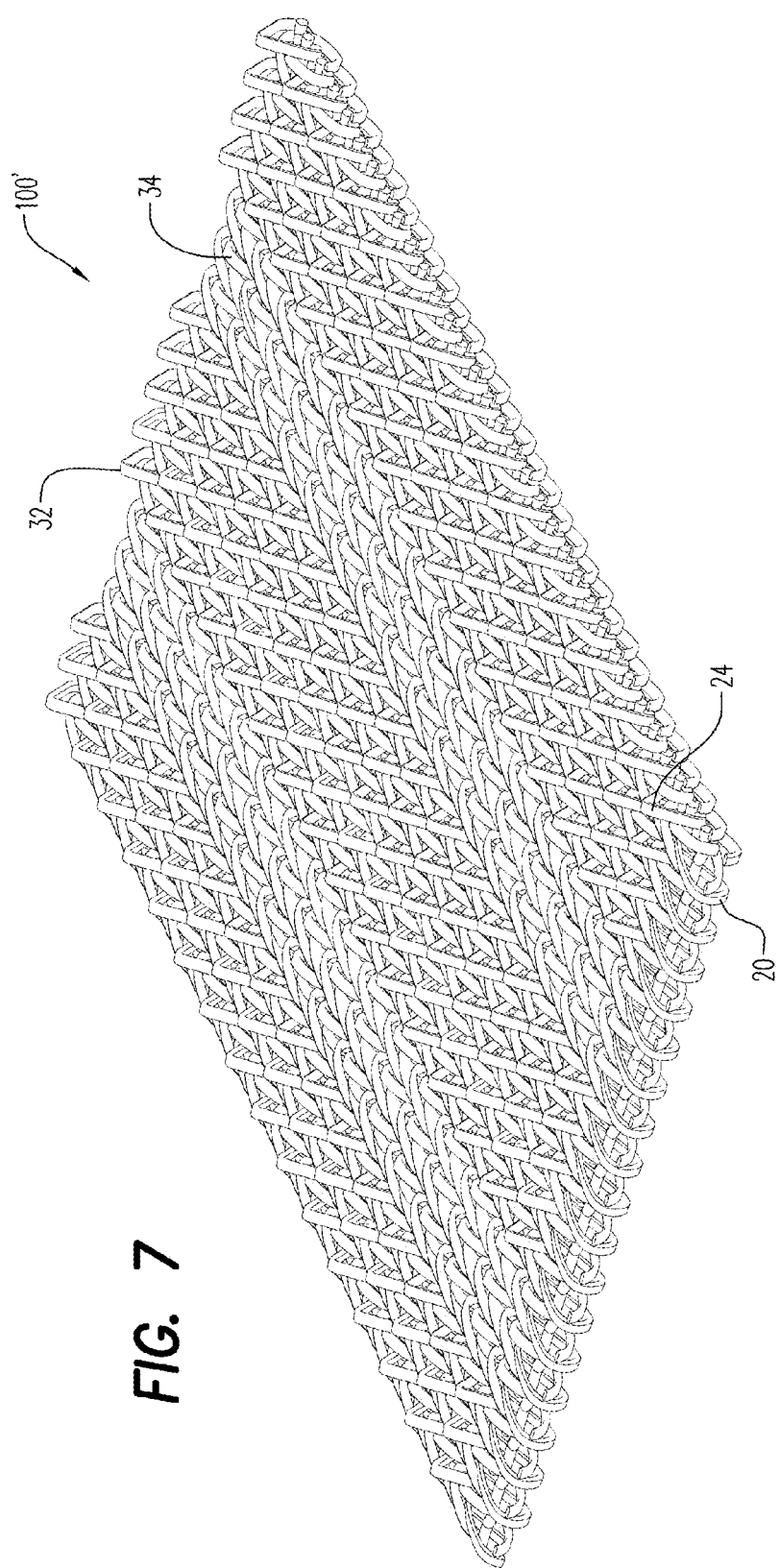
FIG. 7 is a bottom perspective view of a compound-balanced woven wire conveyor belt in accordance with a further exemplary embodiment disclosed herein.
Figure 8:
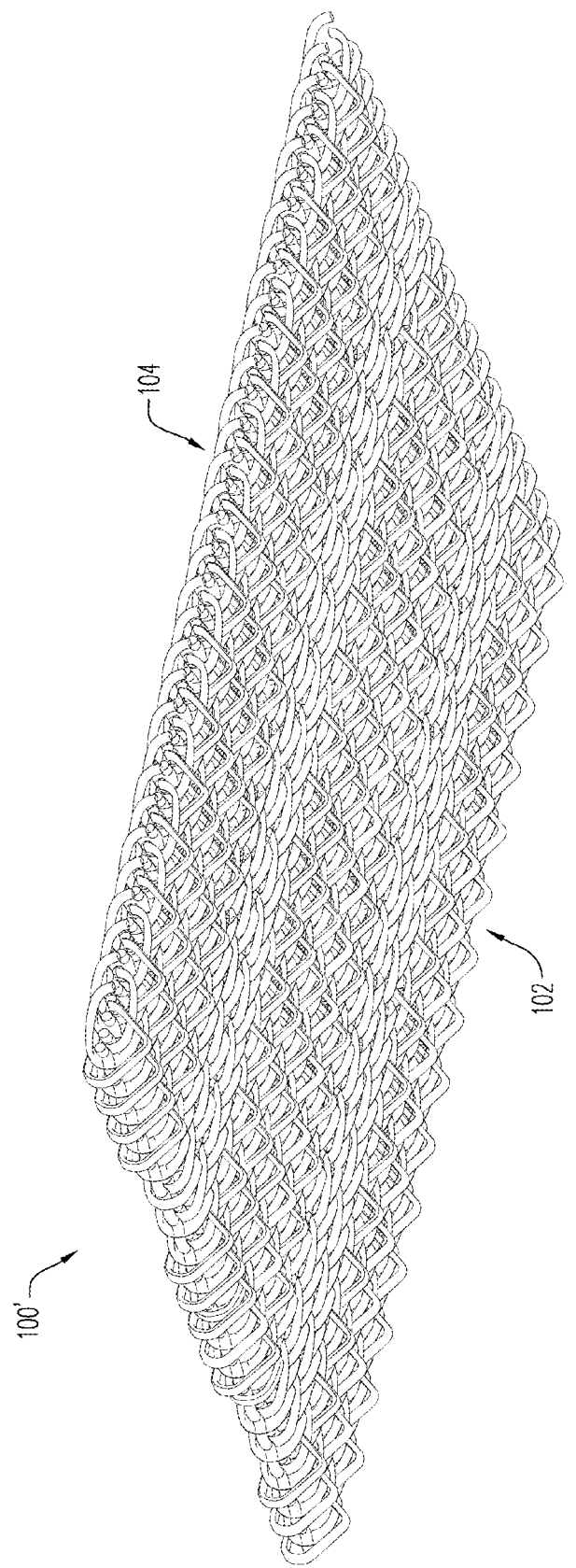
FIG. 8 is a further bottom perspective view of the compound-balanced woven wire conveyor belt shown in FIG. 7.

A further embodiment of the disclosure is directed toward a modified belt 100' as shown in FIGS. 7 and 8. As illustrated, the plurality of "special" or polygon shaped spirals 24 do not traverse the entire width of the belt, but can be constructed in a way that can be segmented in nature. This advantageously forms "drive lanes" 32 for the belt 100' that may be used to engage the drive roll 26, while still allowing for a smooth surface 34 between the lanes 32 to ride on a slider bed or rail system that is traditionally used by current applications. More specifically, the drive lanes 32 allow for linear rails and/or beds with grooves to assist in maintaining the belt 100' centered, thereby reducing product loss from the belt 100'.

Figure 9:
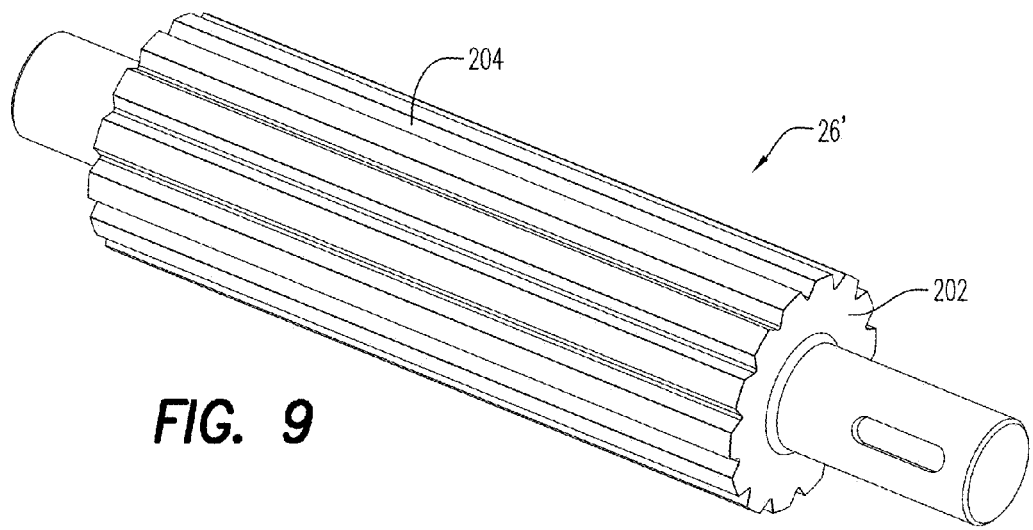
FIG. 9 is perspective view of a drive roll in accordance with a further exemplary embodiment disclosed herein.
Figure 10:
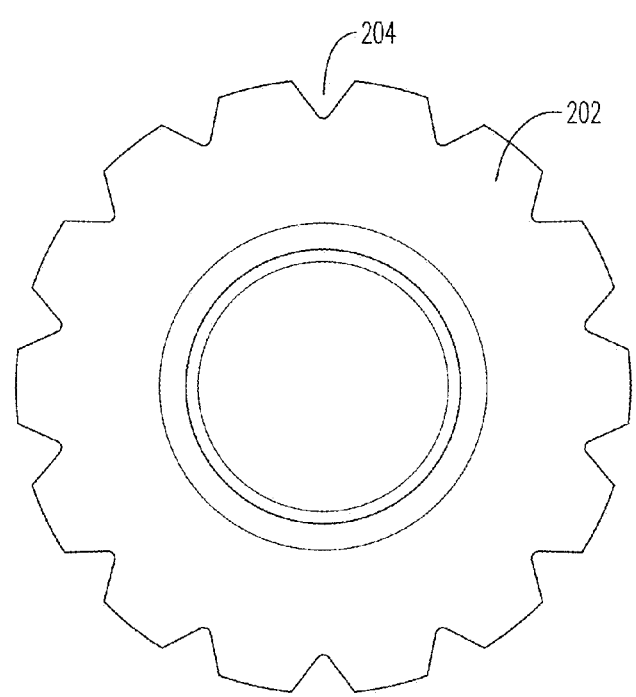
FIG. 10 is an enlarged end elevational view of the drive roll shown in FIG. 9.

An alternative exemplary drive roll, as shown in FIGS. 9 and 10, includes a solid bar 202 with cavities defined as mating grooves 204 cut into the roll 26' to engage in the drive tangs 30 on the surface of the spirals 24.

The compound-balanced woven wire conveyor belt 100, 100' and cooperating drive roll 26, 26' provide an increased mechanical advantage that will allow for reduced counter tensioning. Moreover, the drive rolls and/or guide pulleys utilized in the system will generally be smaller than conventional compound-balanced woven wire conveyor belts due to the added engagement between the drive roll and belt. Because of the added engagement, increased performance in tracking at the head and guide pulleys or rolls is also achieved. The lower overall tension transmitted to the belt 100, 100' will also improve the belt's integrity in that it will not elongate at the same rate as standard friction driven belting. Also, when conventional compound-balanced woven wire belting is subjected to increased tension it can "neck" down in width and this hinders its ability to hinge which can create tracking problems. This tendency will be mitigated in the exemplary disclosed embodiments due to the lessening of the tension in the belt 100, 100'. And still further, since the disclosed system does not utilize sprocket teeth engaged within spiral openings, it will not he limited by the thermal expansion problem of conventional positive drive systems.

Although certain preferred embodiments of the disclosure have been shown and described in detail, it should be understood that various changes and modifications may be made therein without departing from the scope of the appended claims.

We claim:

1. A conveyor system comprising:
   a compound balanced woven-wire belt assembled from a plurality of interwoven helically-wound spirals and connector rods, said woven-wire belt further including a plurality of shaped spiral wires forming self-supporting protruding drive tangs on a surface of the woven-wire belt; and
   at least one hollow rotatable member including an integrally formed outer cylindrical surface symmetrically disposed relative to a central axis of rotation of said member and a plurality of spaced cavities on said outer cylindrical surface for engaging said protruding drive tangs of said woven-wire belt, each of said cavities substantially corresponding in size to the protruding drive tangs.

2. The conveyor system according to claim 1, wherein said plurality of shaped spiral wires are triangular, D-shaped or trapezoidal in shape.

3. The conveyor system according to claim 1, wherein said plurality of spaced cavities on said outer cylindrical surface of said at least one rotatable member comprises a plurality of slots.

4. The conveyor according to claim 1, wherein said plurality of shaped spiral wires extends substantially across an entire width of said compound balanced woven-wire belt.

5. The conveyor according to claim 1, wherein said plurality of shaped spiral wires extends across a portion of a width of said compound balanced woven-wire belt so as to define a plurality of drive lanes and a smooth belt surface adjacent thereto.

6. A conveyor system comprising:
- a compound balanced woven-wire belt assembled from a plurality of interwoven helically-wound spirals and connector rods, said woven-wire belt further including a plurality of shaped spiral wires forming self-supporting protruding drive tangs on a surface of the woven-wire belt; and
- at least one solid rotatable member including an integral outer cylindrical surface symmetrically disposed relative to a central axis of rotation of said member and a plurality of grooves cut into said outer cylindrical surface for engaging said protruding drive tangs of said woven-wire belt.

7. The conveyor system according to claim 6, wherein said plurality of shaped spiral wires are triangular, D-shaped or trapezoidal in shape.

8. The conveyor system according to claim 6, wherein said plurality of grooves extends an entire length of said at least one rotatable member.

9. The conveyor according to claim 6, wherein said plurality of shaped spiral wires extends substantially across an entire width of said compound balanced woven-wire belt.

10. The conveyor according to claim 6, wherein said plurality of shaped spiral wires extends across a portion of a width of said compound balanced woven-wire belt so as to define a plurality of drive lanes and a smooth belt surface adjacent thereto.

11. A drive roll for use in a conveyor system comprising a compound balanced woven-wire belt assembled from a plurality of interwoven helically-wound spirals and connector rods, the woven-wire belt further including a plurality of shaped spiral wires forming protruding drive tangs on a surface of the woven-wire belt, said drive roll comprising:
- at least one hollow rotatable member including an integrally formed outer cylindrical surface symmetrically disposed relative to a central axis of rotation of said member and a plurality of cavities disposed on said outer cylindrical surface for engaging said protruding drive tangs of said woven-wire belt.

12. The drive roll according to claim 11, wherein said plurality of cavities includes a plurality of spaced openings on said outer cylindrical surface.

13. The drive roll according to claim 12, wherein said plurality of spaced openings defines slots in said outer cylindrical surface.

14. The drive roll according to claim 11, wherein said plurality of cavities includes a plurality of grooves cut into said outer cylindrical surface.

* * * * *